Dec. 24, 1968     T. R. SMITH     3,417,775
VACUUM BREAKER DEVICE
Filed Nov. 22, 1965
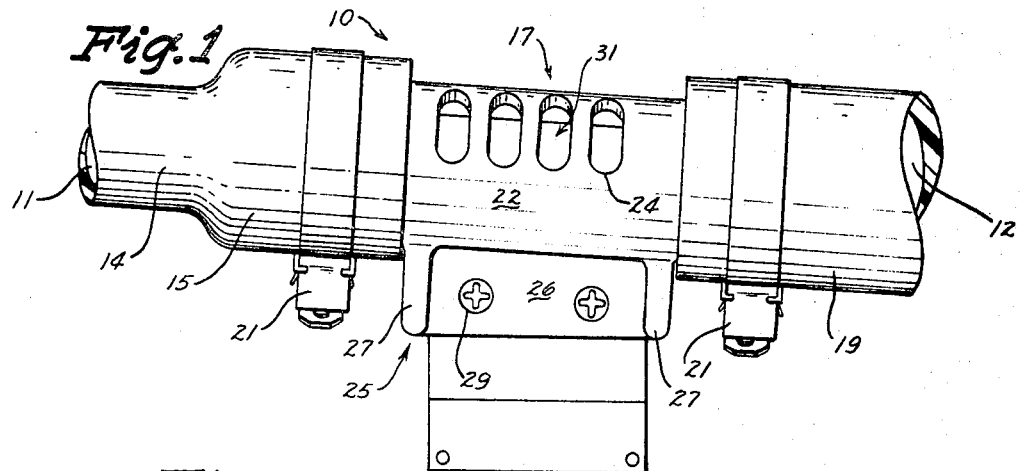
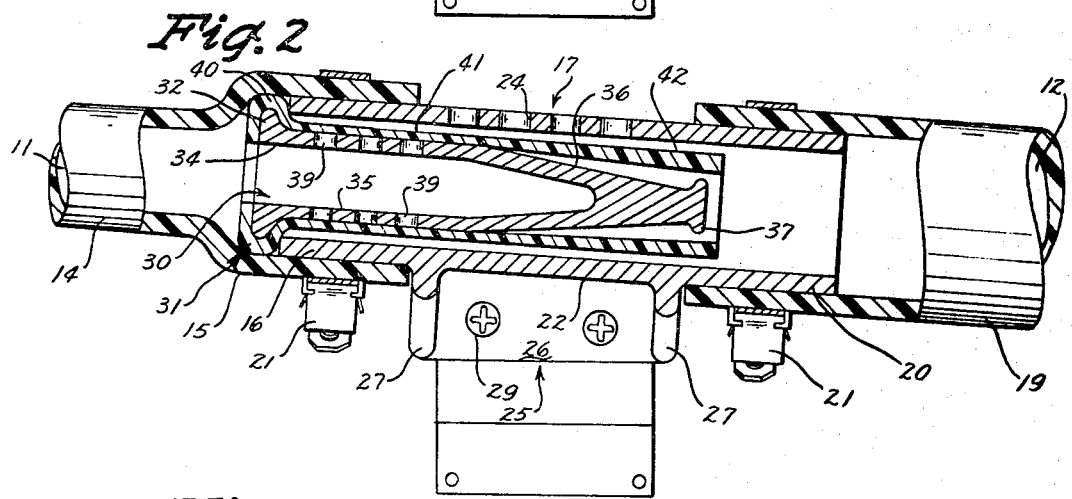
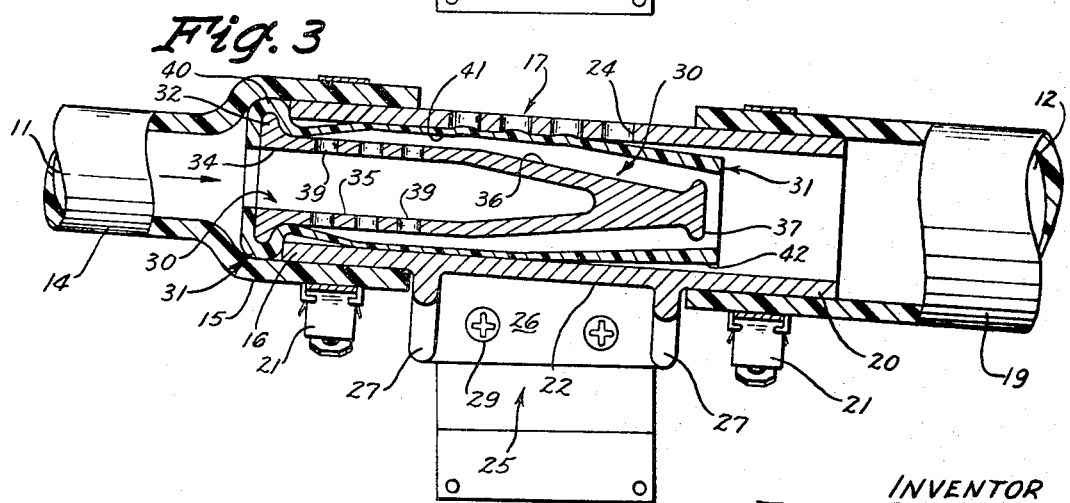
INVENTOR
THOMAS R. SMITH
BY
William G. Landwier
AGENT

United States Patent Office 3,417,775
Patented Dec. 24, 1968

3,417,775
VACUUM BREAKER DEVICE
Thomas R. Smith, Newton, Iowa, assignor to The Maytag Company, Newton, Iowa, a corporation of Delaware
Filed Nov. 22, 1965, Ser. No. 509,006
3 Claims. (Cl. 137—218)

ABSTRACT OF THE DISCLOSURE

A vacuum breaker device is disclosed including a sleeve member connected into a fluid conduit and defining openings venting the the conduit to the atmosphere. Positioned within the sleeve member is a nozzle having an inlet at one end and radially outwardly directed egress openings in a sidewall portion. A resilient valve member in sleeve-like engagement with the egress-defining portion of the nozzle normally closes the egress openings and is responsive to positive fluid pressure at the inlet for expanding the valve member to permit fluid flow through the edgress openings toward the outlet of the conduit.

---

This invention relates to flow control devices and particularly to those commonly referred to as anti-siphon or vacuum break devices useful in preventing the back flow or back siphonage of liquids into a fluid supply system.

There is a definite need for a simple, inexpensive, and yet reliable device for preventing back flow of contaminated liquids into a water supply system. The need for such a device has been recognized in a number of plumbing codes wherein specific requirements are included for means to prevent contamination of the water supply system in the event of a failure which would produce suction instead of pressure at the water supply system outlets. An acceptable back flow preventing device generally seeks to close the supply line when suction develops therein and to admit atmospheric pressure into the conduit, which may be filled with contaminated water, to create an air gap between the inlet and the outlet of the supply conduit.

The requirement for vacuum breaker or other back flow preventing devices is particularly important in automatically controlled appliances provided for the unattended washing of fabrics and dishes. In these devices it is not uncommon that a water supply conduit is connected between the washing unit and the water supply system. It is therefore essential that back flow preventing means be included in, or associated with, the water supply conduit.

Prior art includes a number of devices directed to this need including the devices disclosed in the U.S. patents issued to Glass No. 1,800,066, and Filliung No. 2,663,309. The subject matter of the instant application represents an improvement over the devices disclosed and suggested by these patents.

It is desirable that the device be simple, inexpensive, easily installed in the fluid conduit and fully reliable for performing the intended function of allowing efficient fluid flow in one direction under a broad range of positive pressures of the water supply system and preventing the back flow under the opposite conditions of fluid pressure differential.

It is therefore an object of this invention to provide an improved device for preventing back flow in a fluid conduit.

It is a further object of this invention to provide an improved back flow preventing device which is easily inserted into a fluid conduit to comprise an anti-siphon injector for a washing appliance.

It is a further object of this invention to provide an improved back flow preventing device having an improved mode of construction and operation.

The instant invention achieves the above objectives by providing a unique and novel device for preventing back flow of fluids into a water supply system comprising a fluid conduit having at least one vent hole between the inlet and outlet. Positioned within the conduit is a nozzle having a closed end extending toward the outlet and further having radially directed holes normally covered by a flexible, resilient, tubular valve member. The tubular valve member includes a thin wall portion that is pretensioned on the nozzle and a second portion spaced between the nozzle and the wall of the fluid conduit. The thin wall portion is responsive to positive fluid pressure at the inlet to expand and allow fluid flow from the inlet through the radially directed holes. The fluid then flows within the tubular valve member and along the nozzle into the outlet of said conduit.

Operation of the invention and further objects thereof will become evident as the description proceeds and from an examination of the accompanying drawings which illustrate a preferred embodiment of the invention and in which similar numerals refer to similar parts throughout the several views and wherein:

FIGURE 1 is a longitudinal exterior view of a fluid conduit including the back flow preventing device of the instant invention;

FIGURE 2 is a longitudinal section of the fluid conduit including the back flow preventing means of the instant invention and showing the tubular valve member positioned in contact with the nozzle as when no fluid is flowing through the conduit; and FIGURE 3 is a longitudinal section of the fluid conduit including the back flow preventing means of the instant invention and showing the component members positioned as when the conduit is carrying fluid under pressure at the inlet.

Referring now to FIGURES 1 and 2, the apparatus is shown as comprising a fluid conduit 10 having an inlet portion 11 and an outlet portion 12. The portion 11 is in the form of a flexible hose 14, for example, having an enlarged end 15 mating with and telescoping over the inlet end 16 of a sleeve member 17. The outlet portion 12 is also in the form of a flexible hose 19 and has a similar telescoping inner connection with the outlet end 20 of the sleeve member 17. An adjustable clamp 21 is positioned on the outside of each of the flexible hoses to retain the hoses on the sleeve member 17. The outside surfaces of inlet end 16 and outlet end 20 may be ribbed or serrated to assist in retaining the hoses in position. The inlet hose 14 is intended to be connected to a water supply system and the outlet hose 19 may be connected to a washing machine tub, for example.

The sleeve member 17 includes a substantially cylindrical portion 22 extending between and including the inlet end 16 and the outlet end 20. A plurality of holes or openings 24 for venting the interior of the conduit 10 to the atmosphere are positioned in the cylindrical portion 22 of the sleeve 17 so as to be between the inlet hose 14 and the outlet hose 19 after the hoses are connected to the sleeve member 17. These vent holes 24 may be in the form of slots as shown in FIGURE 1 and may include similar additional openings positioned on the opposite side of the cylindrical sleeve 17.

The conduit sleeve 17 is formed to include an integral bracket portion 25 for securing the conduit 10 to the appliance of which this forms the water inlet device. The bracket portion 25 includes a rearwardly extending and then depending flange 26 and a pair of reinforcing ribs 27 disposed along the ends of the flange 26. The flange portion 26 may be suitably secured to a cabinet mounting bracket, for example, by a pair of screws 29.

The conduit sleeve member 17 is formed of a polypropylene material and has certain characteristics which are particularly advantageous for the instant device. The polypropylene material has a very low water absorption characteristic and will therefore retain its size and shape even after extended periods of contact with water. This material also possesses a relatively high degree of toughness and strength and is thus an ideal material for a device which is subject to the clamping of the inlet and outlet hoses and to high compression at integral bracket 25 by screws 29.

Referring now to FIGURES 2 and 3, a two-part assembly, including a nozzle 30 and a valve 31, is inserted within the sleeve 17 and extends from the inlet end 16 toward the outlet end 20 of the sleeve 17. The innermost member, previously indicated as nozzle 30, includes an annular shoulder 32 defining an ingress 34 at one end thereof. Connected to the shoulder 32 is a tubular portion 35 which is connected in turn to a tapering or conical portion 36 extending toward the outlet end 20 of the sleeve member 17. The conical portion 36 blends into a radially outwardly extending flange 37 at the end of the nozzle 30. As previously indicated, nozzle 30 is openly communicating with the inlet through the shoulder-defined ingress 34 and is closed to fluid flow at the conical end. Disposed around the tubular portion 35 is a plurality of egress holes 39 for directing the fluid radially outwardly from the interior of the nozzle 30.

Positioned between the wall of the conduit sleeve 17 and the nozzle 30 is a resilient, flexible, valve member 31. The valve 31 includes, at one end, a radially outwardly extending and then re-entrant flange portion 40 encompassing the annular shoulder 32 of the nozzle 30. The resulting shoulder formed by the nozzle shoulder 32 and the encompassing flange 40 is located against the inlet end 16 of the conduit sleeve 17 and is retained in this predetermined position by the unexpanded portion of inlet hose 14 abutting the flange portion 40 of the valve 31. The re-entrant flange portion 40 of the valve 31 serves as a sealing lip to prevent leakage of moisture around the nozzle and valve assembly and through the joint or connection formed between the inlet hose 14 and the conduit sleeve 17.

The valve 31 further includes a tubular portion 41 extending axially from the inlet flange 40. This tubular portion 41 is relatively thin and flexible and is assembled with a pretension on the tubular portion 35 of the nozzle 30 to normally close and seal the nozzle egress openings 39 when there is an absence of positive fluid pressure at the inlet portion 11. This thin tubular portion 41 is of necessity very thin and highly flexible in order to be responsive for expanding to allow flow through egress openings 39 under the condition of low fluid pressure. This tubular portion covers a relatively large area and is capable of sealing around foreign objects which might otherwise prevent the closing of the egress openings 39. A wall portion 42 extends from the tubular portion 41 toward the outlet end 20 of the sleeve member 17 and terminates at a point just past the flared portion 37 at the end of the nozzle. Wall portion 42 has gradually increasing wall thickness toward the outlet portion 12 and is positioned so as to be spaced from the inner surface of sleeve 17 and the outer surface of tapering portion 36. The increasing wall thickness prevents the twisting and collapsing, or fluttering, of this portion of the valve during or upon encountering unusual conditions of fluid flow, such as high pressure. This variable thickness provision within valve 31 also aids in achieving selectively greater expansion of the tubular portion 41 adjacent egress openings 39.

The nozzle 30 may be formed of the same material as the conduit sleeve 17. Polypropylene material, having low moisture absorption characteristics, is desirable since changes in size, shape, or contour of the injector nozzle 30 during use should be avoided. The valve 31 is formed of an elastomeric material, ethylene-propylene terpolymer. This material, more commonly known as EPT rubber, has the desirable characteristics of being resistant to ozone, hot water, detergent and bleach; resistant to compression set; and having retention of high and low temperature flexibility after long periods of exposure. The material thus possesses ideal characteristics for valve member 31 which is subject to both hot and cold water while being under various conditions of tension.

The conical and flange portions 36, 37 of the nozzle 30 cooperate with the thicker terminal portion 42 of the valve 31 to establish desirable flow characteristics. There is a limited amount of back pressure developed by this arrangement for effecting greater expansion of the tubular portion 41 of the valve 31. In addition, the expansion tends to be steady, and more uniform than that achieved with other arrangements so that fluttering and periodic partial collapse of the end 42 of the valve member 31 is substantially eliminated. As a net result improved fluid flow is achieved.

It is noted in FIGURE 2 that a clearance is provided between the inner wall of the conduit sleeve member 17 and the outer portion of the valve 31. This clearance provides an annular vent passage for venting the conduit 10 to the atmosphere, as will be more fully explained hereinafter.

The advantages and novel improvements of the instant invention over the prior art follow from the foregoing description. More specifically, it is seen that the disclosed device is operable for effecting an efficient fluid flow under conditions of both low and high fluid pressure. A resilient, highly flexible, valve member is generally used to provide operation or response at low pressure; however, this type of a valve member is also susceptible to excessive flutter when high pressures are encountered. The valve and nozzle construction of the instant invention, as previously described, achieves the desired low pressure operational characteristics while avoiding the flutter problems at high pressure fluid flow and thus is unique in the device of the instant invention.

In describing the operation of the back flow preventing device of the instant invention, it may be initially noted that FIGURES 2 and 3 show the relative positioning of the valve member 31 under two conditions of fluid flow. FIGURE 2, as previously indicated, shows the pretensioned, but otherwise unexpanded, position of the valve member 31. This condition is assumed when there is no fluid flowing, or when there is an absence of positive pressure at the conduit inlet. This absence of a positive pressure includes both a no pressure condition and a negative pressure condition. FIGURE 3 shows the relative condition of the valve member 31 under a condition of positive pressure at the conduit inlet with fluid flowing into the nozzle 30 and out through the egress openings 39 for expanding the valve member 31 against the inner wall of the conduit sleeve 17.

Under the normal condition of positive pressure of the fluid supply system, there will be fluid flowing through the conduit 10 by a path which includes radial flow from the nozzle 30 out through the egress openings 39 to expand the valve member 31 and then axially along the nozzle 30 and between the thicker portion 42 of the valve 31 and the end portion 37 of the nozzle 30. Radial flow of water from the egress openings 39 expands the thin wall tubular portion 41 of valve member 31 in the area adjacent the egress openings and may seal the vent holes 24 in the conduit sleeve member 17 but it is not essential that the holes 24 be sealed for proper operation of the device. It is possible, and acceptable, that some or all of the vent holes 24 may remain open to allow some aspiration of air into the conduit 10 during normal fluid flow conditions.

If a vacuum or a condition of negative pressure occurs at the conduit inlet, the instant invention will function to prevent the back flow of contaminated fluids from the conduit outlet toward the inlet of the device. This condition of a vacuum or negative pressure at the inlet may occur upon a failure within the water supply system which tends to induce fluid flow in the opposite direction. In this application positive pressure at the inlet is defined as that condition which causes flow from the fluid supply system and through the conduit in a direction from the inlet to the outlet, while negative pressure or a vacuum pressure is defined as that condition which tends to cause flow from the outlet toward the inlet.

Upon a reversal of pressures from positive to negative, the flexible valve member 31 will react to move generally from the position shown in FIGURE 3 to the position shown in FIGURE 2. The negative pressure or vacuum at the inlet will tend to more effectively seal the valve member 31 against the egress openings 39 to prevent fluid flow from the outlet toward the inlet. In addition the vent holes 24 are opened to allow atmospheric air to enter the conduit 10 and create or effect a vacuum break and thereby prevent the flow of fluids from the outlet toward the inlet.

If the valve 31 should fail because of rupture or deterioration of the resilient material, the device will continue to prevent the flow of liquid from the outlet to the inlet because of the venting of the conduit to the atmosphere. In addition, the instant invention may be mounted in any orientation with respect to the appliance including a vertical position.

It is thus seen that the present invention provides an improved back flow preventing device having the advantages of reliability and a relatively simple construction. Further advantages are present in the elongated valve member wherein it is effective for providing a relatively large surface for sealing. This is a device in which the flexible valve member and the nozzle cooperate to provide for improved fluid flow under normal operating conditions. Further advantages are realized in the integral mounting bracket and in the improved construction to provide easily mountable inlet and outlet hoses for easy insertion of the device into a fluid conduit.

In the drawings and specification, there has been set forth a preferred embodiment of the invention and although specific terms are employed, they are used in a generic and descriptive sense only and not for purposes of limitation. Changes in form and proportion of parts, as well as the substitution of equivalents are contemplated, as circumstances may suggest or render expedient, without departing from the spirit or scope of this invention as further defined in the following claims.

I claim:

1. A vacuum breaker device for use in a fluid-carrying conduit comprising: a sleeve member connectable into said conduit to form a portion thereof and including at least one opening for venting said fluid-carrying conduit to the atmosphere; a longitudinally extending hollow nozzle means positioned within said sleeve member, said nozzle means including an inlet end portion having sealed relationship with said sleeve member and defining an ingress communicating with the inlet of said conduit for conducting fluid into said nozzle means and further including a substantially tubular wall portion inwardly spaced from said sleeve member and defining at least one egress opening for directing fluid from said nozzle means in a generally radial direction and further including a closed elongated extension portion; a substantially tubular resilient valve member positioned between said sleeve member and said nozzle means and having a first end portion retained adjacent the inlet end portion of said nozzle means, said valve member including a thin wall portion inwardly spaced from said sleeve member adjacent said egress opening and normally having sleeve-like engagement along a major portion of the egress-defining wall portion of said nozzle means encompassing and closing said egress opening and responsive to positive fluid pressures at said inlet for expanding toward said sleeve member and permitting fluid flow through said egress opening, said valve member further including an elongated second end portion extending along and radially spaced from said nozzle member elongated extension portion effecting fluid flow from said egress opening and past said vent and cooperable therewith for changing said generally radial flow from said egress opening into an axial flow between said elongated extension portion and said valve end portion and directing the axial flow toward the outlet of said conduit, said valve member being further responsive to a negative pressure differential at said inlet for closing said egress opening and venting said conduit to prevent flow from said outlet toward said inlet.

2. A vacuum breaker device for use in a fluid-carrying conduit as defined in claim 1 and wherein restriction means extend into the radial space between said nozzle means and the second end portion of said valve member for reducing the effective flow opening and effecting a fluid back pressure in said space.

3. A vacuum breaker device for use in a fluid-carrying conduit as defined in claim 1 and wherein the thin wall portion of said valve member is pretensioned on the egress-defining portion of said nozzle means and wherein the second end portion of said valve member comprises a wall having gradually increasing thickness toward said outlet.

References Cited

UNITED STATES PATENTS

| 1,800,066 | 4/1931 | Glass | 137—525 X |
| 2,328,382 | 8/1943 | Langdon | 137—218 |
| 2,663,309 | 12/1953 | Filliung | 137—218 |
| 2,869,572 | 1/1959 | Person | 137—218 |
| 3,307,571 | 3/1967 | Smith | 137—218 |

FOREIGN PATENTS 710,105   5/1965   Canada.

WILLIAM F. O'DEA, *Primary Examiner.*

DENNIS H. LAMBERT, *Assistant Examiner.*

U.S. Cl. X.R.

137—525